June 30, 1964  E. F. BEEZER ETAL  3,139,120
AUTOMATIC GRID WINDING APPARATUS
Filed Nov. 8, 1957  10 Sheets—Sheet 2
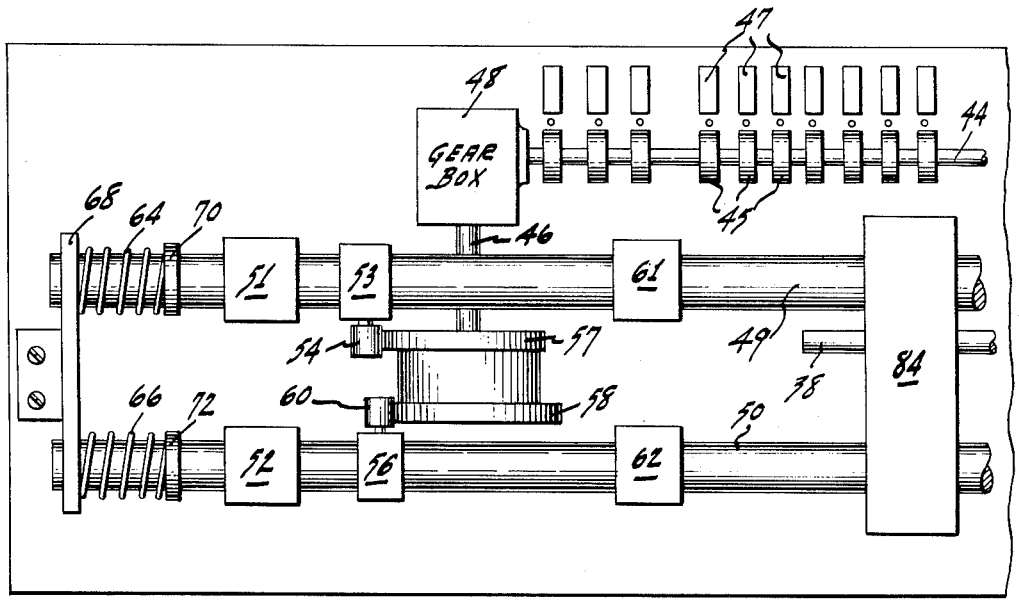
Fig.22
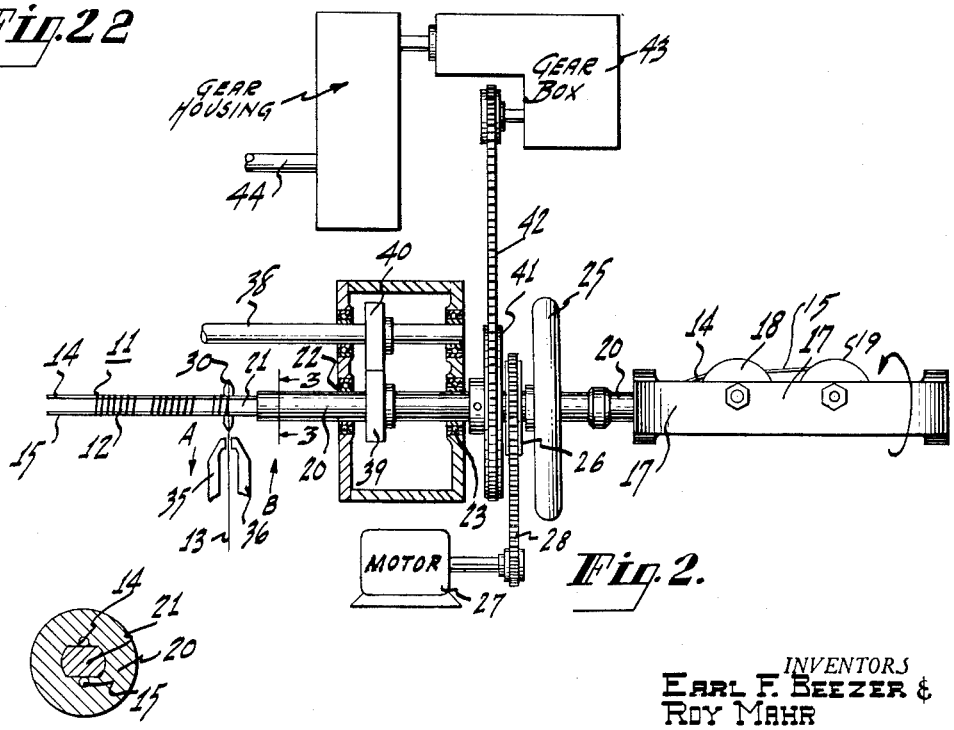
Fig.2.
Fig.3.
INVENTORS
EARL F. BEEZER &
ROY MAHR
BY William A. Zalesak
ATTORNEY

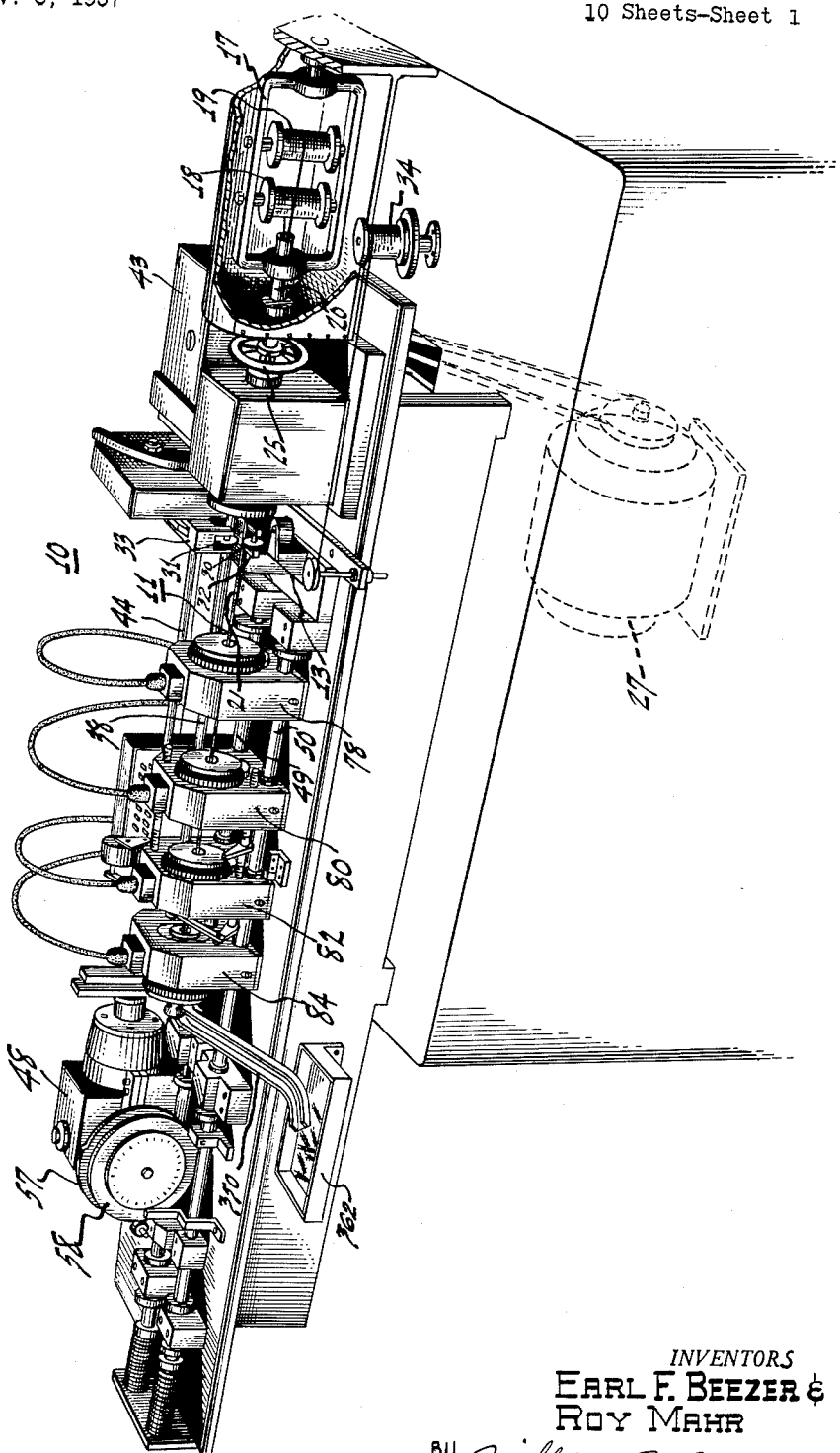

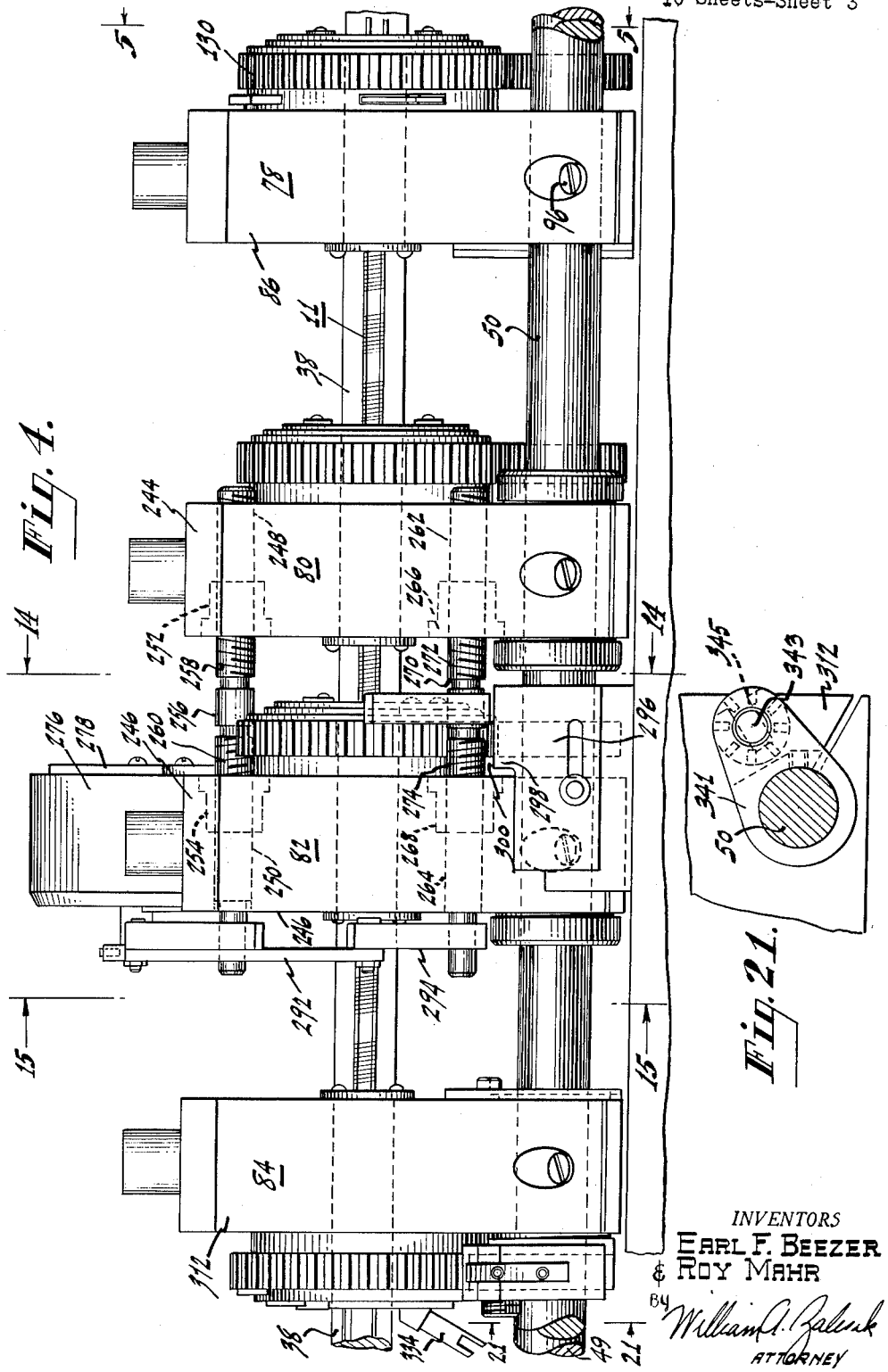

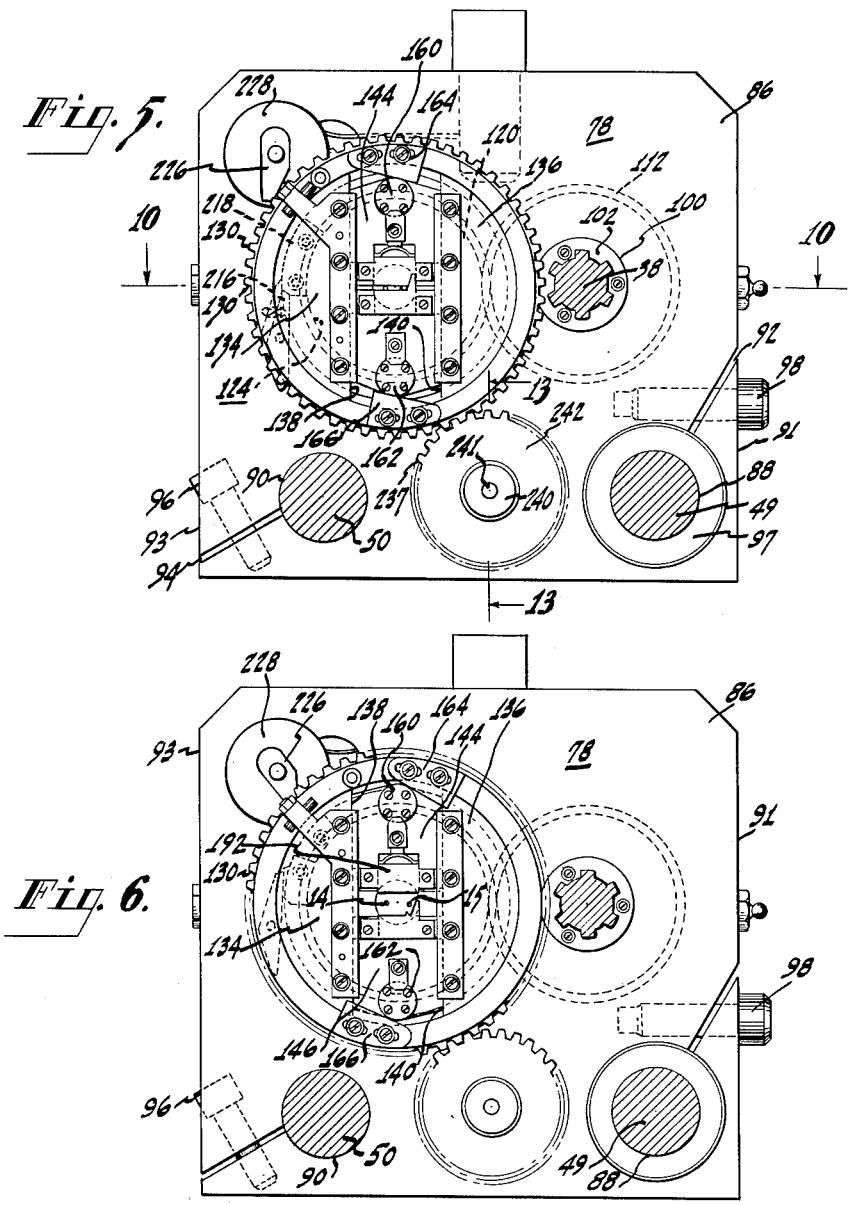

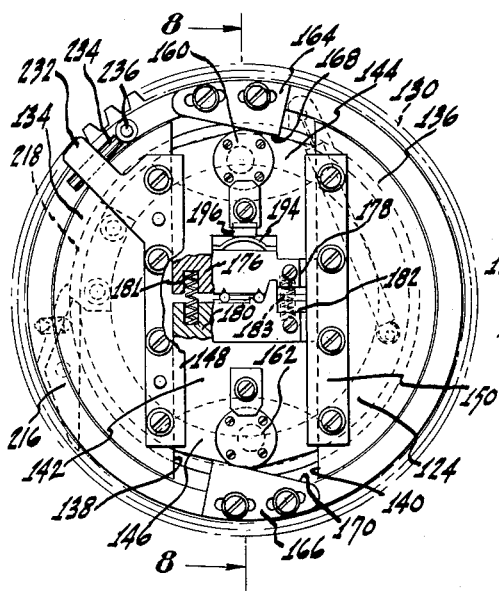
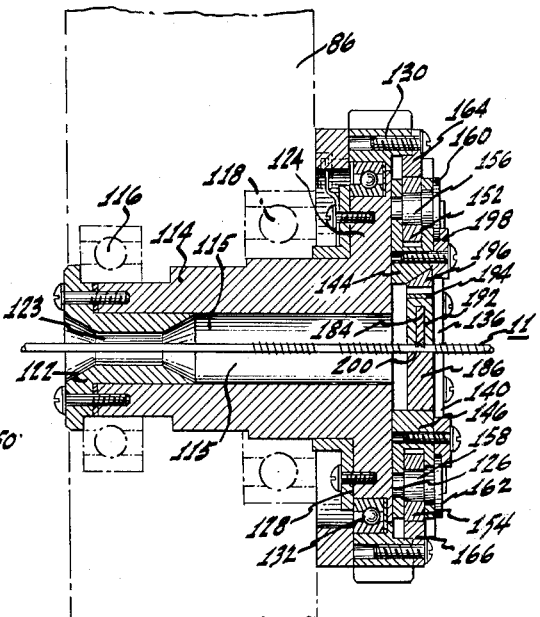
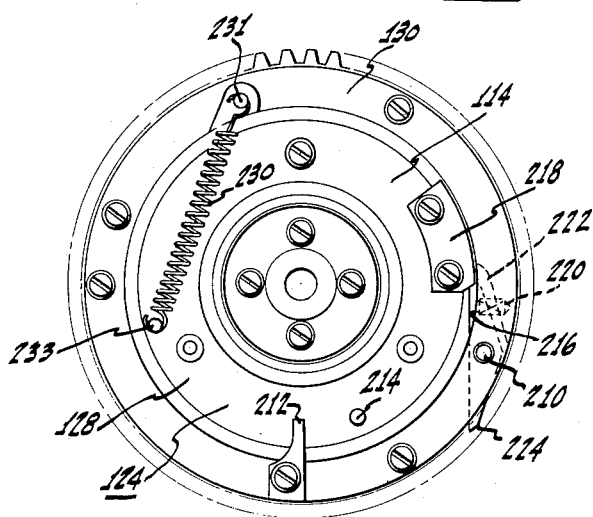

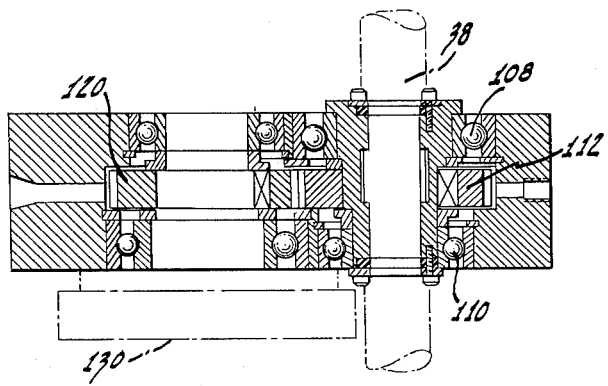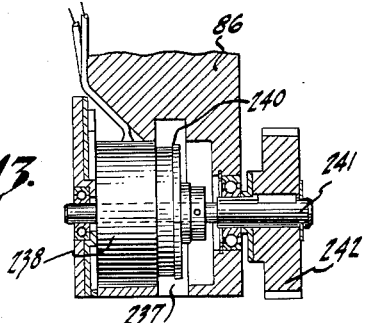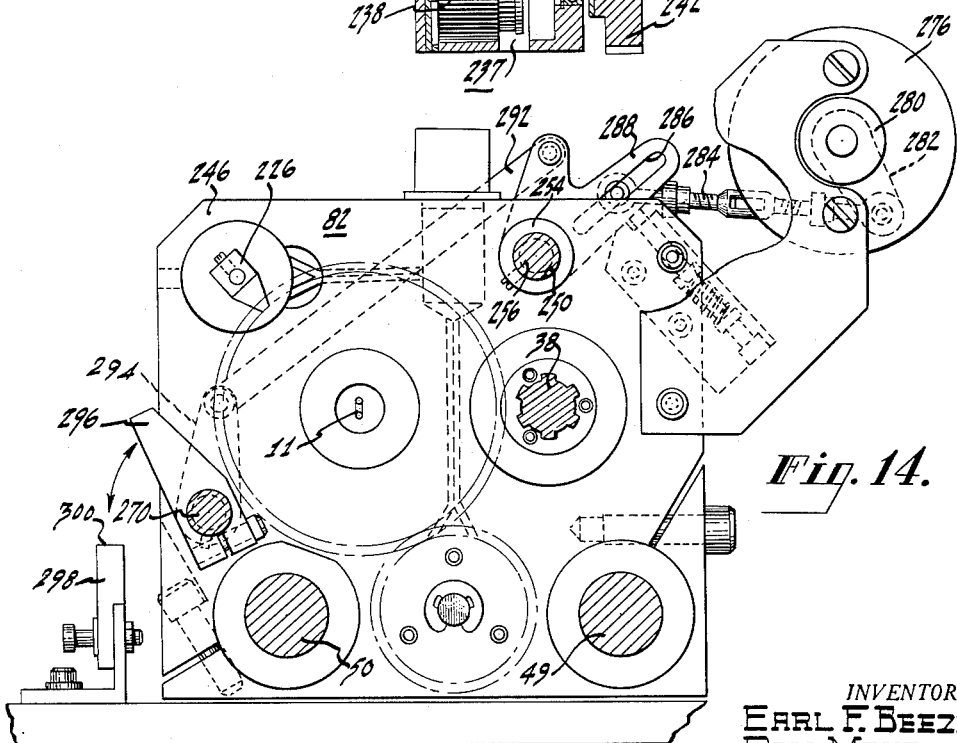

June 30, 1964  E. F. BEEZER ETAL  3,139,120
AUTOMATIC GRID WINDING APPARATUS
Filed Nov. 8, 1957
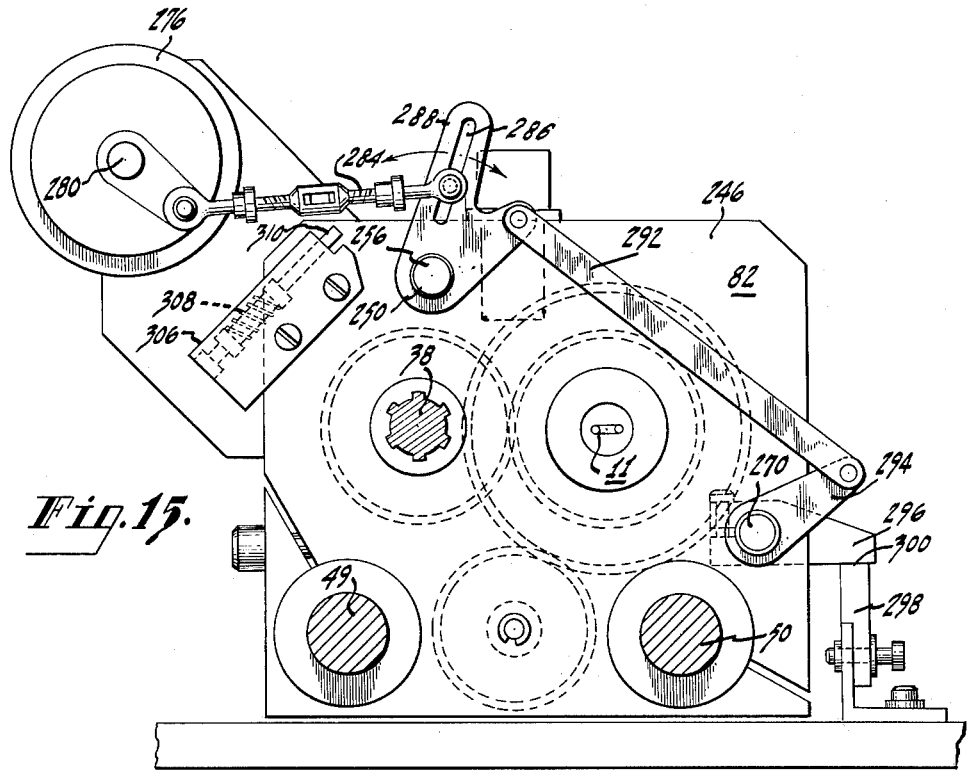
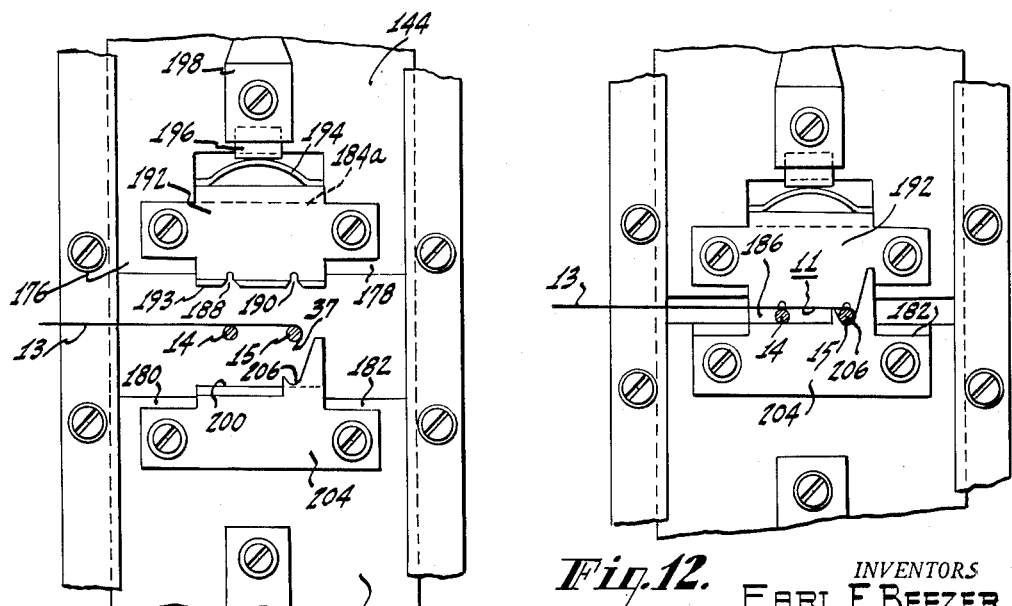
INVENTORS
EARL F. BEEZER &
ROY MAHR
BY William A. Balunek
ATTORNEY

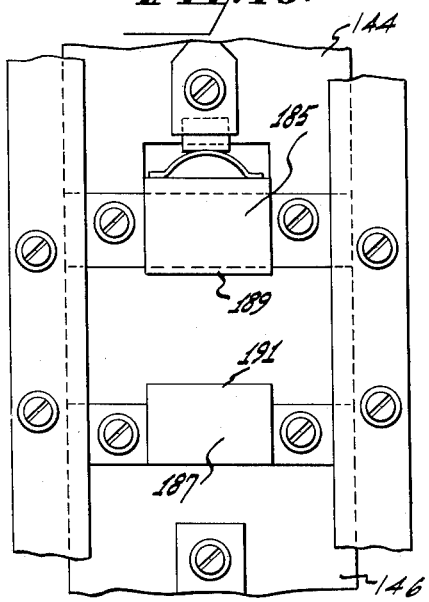
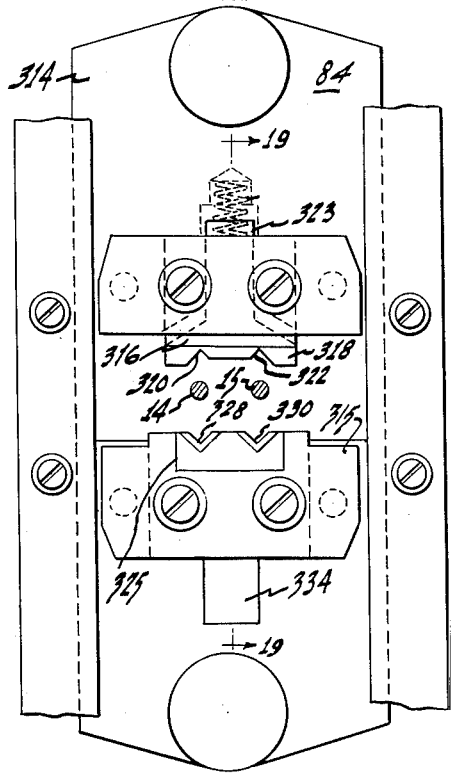
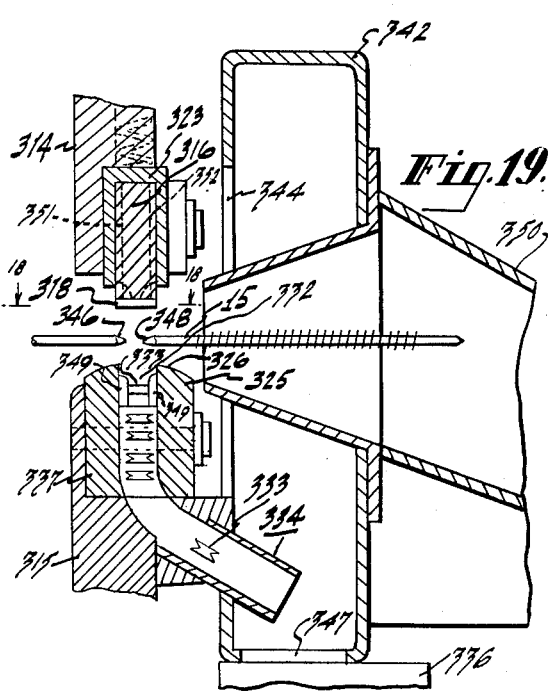
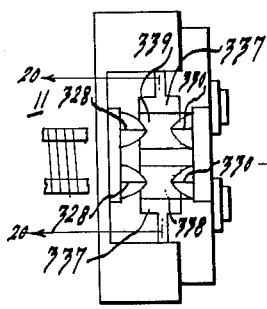

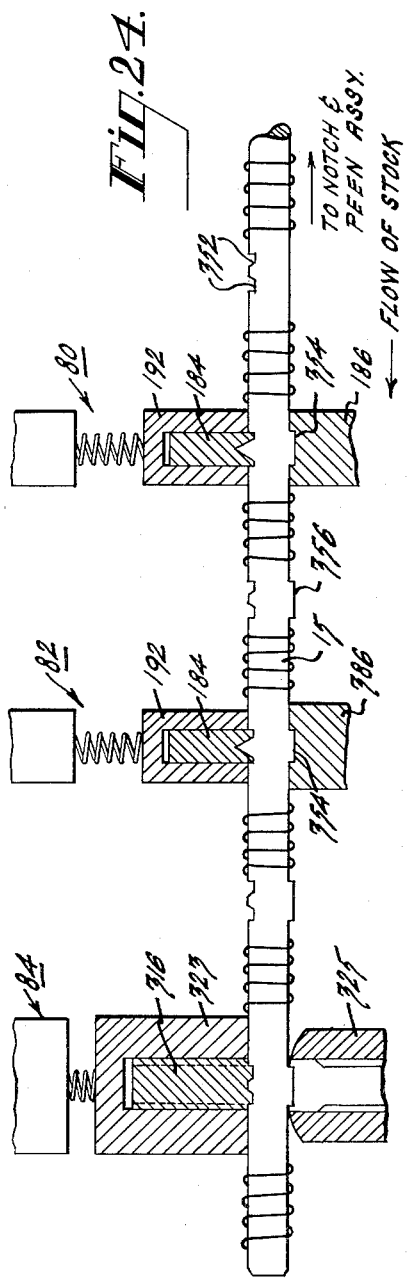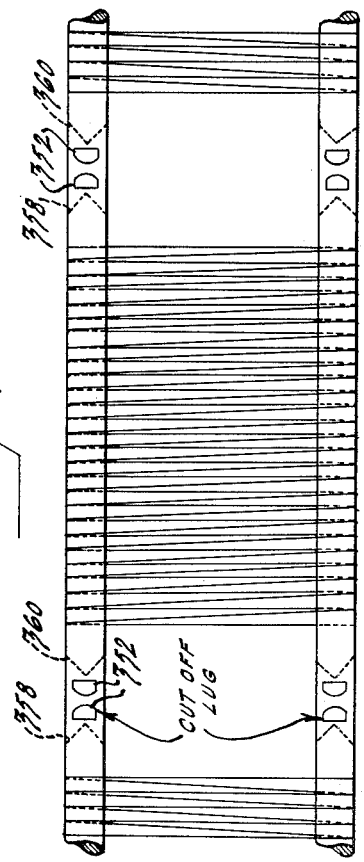

United States Patent Office 3,139,120
Patented June 30, 1964

3,139,120
AUTOMATIC GRID WINDING APPARATUS
Earl F. Beezer, Paramus, and Roy Mahr, Harrison, N.J., assignors to Radio Corporation of America, a corporation of Delaware
Filed Nov. 8, 1957, Ser. No. 695,423
34 Claims. (Cl. 140—71.5)

This invention relates to apparatus for automatically making wound grids for use in electron tubes.

One type of wound grid used in electron tubes comprises two or more side rods having a helical grid lateral wire fixed thereto. In the manufacture of such grids the grid lateral wire is wound around and along the suitably spaced-apart side rods. While grid making machines are known, such machines have not proven entirely satisfactory.

Previous machines of the type wherein a spool of grid lateral wire is caused to rotate about non-rotating side rods have certain inherent disadvantages. For example, in the winding of flat grids on such previous machines the fineness of the grid lateral wire is limited by the tensile strength of the wire due to the fact that the tension on the wire continuously changes as different portions of the lateral wire turns are formed. Since the rotating lateral wire spool must be positioned relatively close to the side rods in order to reduce the magnitude of centrifugal force on the spool, a relatively short length of unspooled wire is called upon to take the brunt of the varying tensile forces. Also, in such previous machines notching and peening tools are carried on a lateral wire spool support that rotates about the side rods. This gives rise to balancing problems in high speed rotation of the spool support. Then, too, the resultant mass that must be subjected to rotation about the side rods limits the speed of rotation and thus also limits the grid winding speed. Also, the quantity of grid lateral wire that may be loaded onto the spool is limited by the maximum mass that can be subjected to such rotation.

Other grid winding machines are known in which short lengths of grid strip stock are produced by rotation of side rods while feeding grid lateral wire to the side rods. However, such other machines, too, have not proven entirely satisfactory. Such other machines produce short lengths of grid strip which must be individually handled. Also, separate means must be provided for subjecting each of the short grid-strip lengths to a stretching operation for individually straightening the lengths. Then, too, in such other machines a single grid lateral wire winding is first wound on each grid-strip length, then portions of the winding are removed to provide separate grid portions, and finally the grid portions are separated from each other to form individual grids. The foregoing discontinuous handling techniques increases the length of time required to manufacture grids.

Accordingly, an object of the invention is the provision of improved high speed, continuously operable grid winding apparatus.

Another object is to provide grid winding apparatus, wherein grids are wound and stretched in a continuous operation.

A further object is the provision of improved apparatus for making grids having relatively fine grid lateral wire.

Another object is the provision of improved grid winding apparatus wherein the lateral wire winding speed is substantially independent of the fineness or tensile strength of the lateral wire.

Still another object is the continuous production of grid stock having separate, spaced apart grid lateral windings without resort to unwinding portions of a grid lateral winding.

A yet further object is the provision of improved appaartus for winding and stretching grid strip stock and separating portions of the stock into individual grids in a single, continuous operation.

The foregoing and related objects are realized according to the invention in a grid winding apparatus which makes grids in a single, continuous operation. The apparatus includes means for forming a grid strip by winding grid lateral wire around a number of spaced-apart side rods, and means for feeding the grid strip along the apparatus first to means for stretching the grid strip and then to means for severing individual grids from the grid strip. The grid strip is wound by means of a rotating mandrel co-operating with a similarly rotating source of side rod wire. The feeding of the grid strip is performed by two similar feed heads which include rotating means for gripping the rotating grid strip. The two heads reciprocate out of phase with each other to continuously feed the grid strip longitudinally along the apparatus. The grid stretching means includes one of the feed heads and a third head similar to the first two heads, the two heads of the grid stretching mechanism being driven apart while they grip the grid strip and while advancing longitudinally of the apparatus, thus providing the desired stretching during the longitudinal advance of the strip. The grid severing means comprises a fourth head, similar to the other three heads, and includes novel means for severing individual grids from the grid strip and shaping the ends of the grids during the severing operation.

The invention is described in greater detail in the accompanying nine sheets of drawings wherein the figures are grouped in several categories to facilitate a description of the aforementioned embodiment.

FIGS. 1, 2, and 3 illustrate general aspects of the apparatus of the invention, and wherein:

FIG. 1 is a perspective view of apparatus according to the invention;

FIG. 2 is a plan view of the side rod and grid lateral wire feeding arrangements of the apparatus of FIG. 1, and illustrates the winding of the lateral wire around the side rods; and FIG. 3 is a sectional view taken along line 3—3 of FIG. 2 and shows a portion of the side rod feed of FIG. 2.

FIGS. 4 to 19 illustrate various aspects of driving heads used in the apparatus of FIG. 1, and wherein:

FIG. 4 is a front elevational view of a portion of the apparatus of FIG. 1 and illustrates four driving heads of the apparatus;

FIGS. 5 and 6 are sectional views, taken through line 5—5 of FIG. 4, illustrating two successive positions of one of the heads of FIG. 4;

FIG. 7 is an enlarged front view of the rotatable portion of the head shown in FIG. 5;

FIG. 8 is a sectional view taken on line 8—8 of FIG. 7;

FIG. 9 is a back view of the head portion shown in FIG. 7;

FIG. 10 is a sectional view taken through line 10—10 of FIG. 5;

FIGS. 11 and 12 are enlarged views showing a grid strip gripping mechanism of FIG. 7 in two successive positions;

FIG. 13 is a sectional view taken along line 13—13 of FIG. 5;

Figure 23:
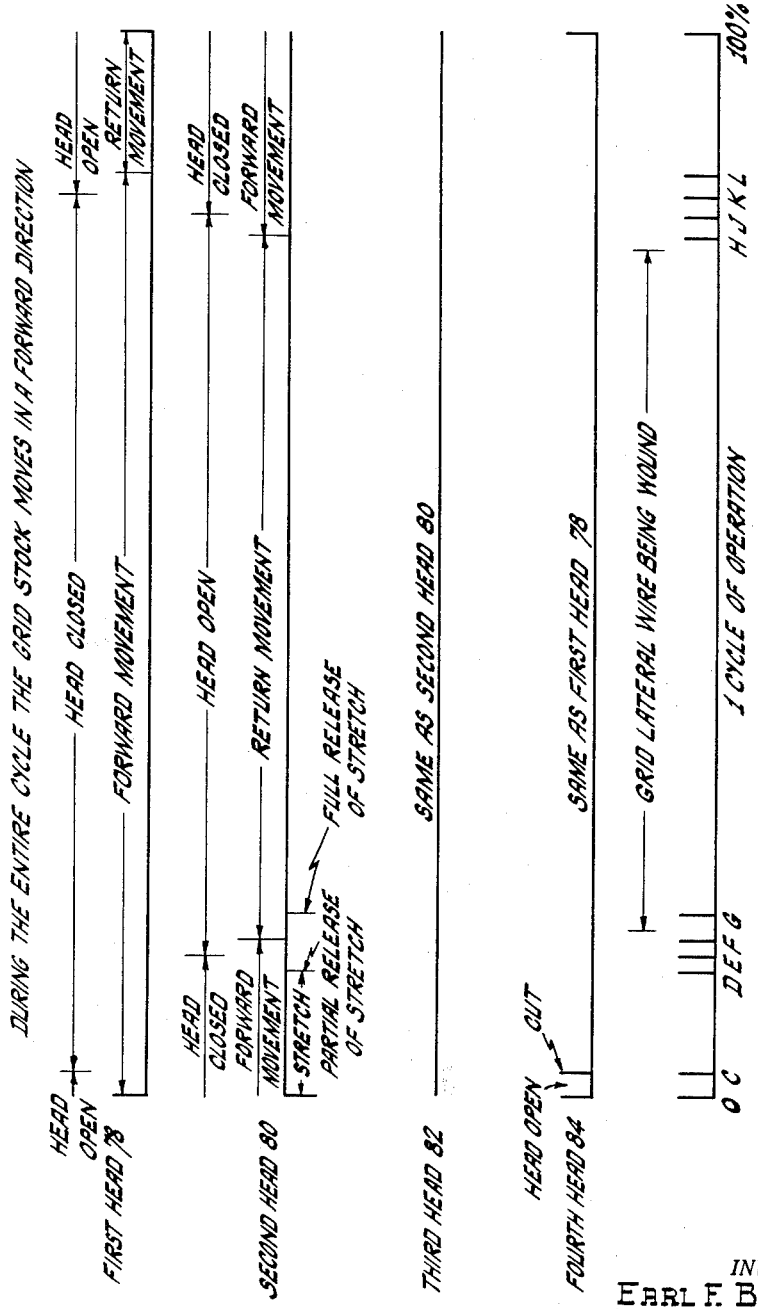

FIGS. 14 and 15 are right and left sectional views of one of the heads shown in FIGS. 1 and 4 and are taken through, respectively, lines 14—14 and 15—15 of FIG. 4;

FIG. 16 is an enlarged view showing a grid strip gripping mechanism similar to the one in FIGS. 11 and 12;

FIG. 17 is an enlarged view of a grid strip severing mechanism in one of the driving heads shown in FIG. 4; and FIGS. 18 and 19 are, respectively, plan and sectional side elevation views taken through lines 18—18 of FIG. 19 and 19—19 of FIG. 17, with portions of the structure of FIG. 19 omitted from FIG. 17.

FIG. 20 is a sectional view taken on line 20—20 of FIG. 18;

FIGS. 21 to 23 illustrate various aspects of the driving mechanism of the apparatus of FIG. 1, and wherein:

FIG. 21 is a sectional view of a portion of the driving mechanism of the apparatus taken through line 21—21 of FIG. 4;

FIG. 22 is a partially schematic plan view of a portion of the driving mechanism of the apparatus;

FIG. 23 is a timing chart illustrating some of the operations of the driving heads depicted in FIG. 4;

FIG. 24 is a schematic presentation of the grippers of three heads and the cutters of the fourth or severing head of the apparatus shown in FIG. 1 in operative relation with respect to a grid strip; and FIG. 25 is a plan view of the grid strip shown in FIG. 24 and shows in full lines, impressions formed in the side rod stock by the three gripping heads, and shows in dotted lines the cuts produced in the side rod stock by the severing head.

Grid making apparatus 10 (FIG. 1) embodying the principles of the invention is adapted to make an endless strip 11 (FIG. 2) of grids, the grid strip 11 comprising a plurality of spaced groups of turns 12 (FIG. 2) of relatively fine grid lateral wire 13 wound on continuous lengths of grid side rod stock 14 and 15. The apparatus 10, in a continuous operation, winds the grid strip 11, stretches it, and severs it into individual grids useful in electron tubes.

Grid Winding Mechanism

The grid winding mechanism (FIGS. 2 and 3) includes means for supporting the side rod stock 14 and 15, means for continuously feeding the side rod stock to the left in FIG. 2, and means for winding the grid lateral wire turns on the side rod stock.

The means for supporting the side rod stock 14 and 15 includes a frame 17 (FIG. 2) which carries two spools 18 and 19 of side rod wire stock. The spools referred to are positioned in spaced relation along the direction of feed of the wires carried thereby. This spaced relation disposes the spools closely adjacent to the axis of rotation of frame 17. This in turn reduces the centrifugal force produced during rotation of the frame 17. Since it is practically impossible to eliminate all unbalance of the spools about the axis of rotation, the reduced centrifugal force produced by the spools permits increased speed of rotation even though the aforementioned unbalance exists.

The frame 17 is fixed to a hollow shaft 20 for rotation therewith, the shaft 20 carrying a mandrel 21 (FIG. 3) within it. The shaft 20 is mounted for rotation in suitable bearings 22 and 23, which are preferably of the ball type. The side rod stock 14 and 15 is fed from spools 18 and 19 into the hollow shaft 20 and is supported on opposite sides of the mandrel 21 (FIG. 3). The side rod stock is drawn longitudinally along and beyond the mandrel 21 by the grid strip feeding mechanism to be described below.

Means are provided for rotating or driving the shaft 20 and the various components associated therewith. This driving means includes a handwheel 25 secured to the sleeve 20 for manual rotation thereof and a sprocket 26 secured to the shaft 20 and coupled to a motor 27 by a chain 28 by which automatic rotation is achieved. The shaft 20 to motor 27 coupling may, if desired, be made through a clutch (not shown).

The shaft 20 and mandrel 21 extend longitudinally to the left (FIGS. 1 and 2) to an area where the grid lateral wire 13 is wound on the side rod stock 14 and 15. The mandrel 21 (FIG. 2) extends beyond the end of the shaft 20 and serves as an anvil for a pair of notching and peening rollers, 30 and 31 respectively, which are mounted opposite each other adjacent to the winding mandrel. For simplicity of presentation, the peening roller 31 has been omitted from FIG. 2 and is shown only in FIG. 1. The rollers 30 and 31 are carried by suitable support assemblies 32 and 33, respectively, by means of which they may be moved into and out of operative relation with the winding mandrel. The notching roller 30 is positioned beneath the mandrel 21 and the peening roller 31 is positioned above the mandrel, for a purpose to be described.

The grid lateral wire 13 is fed from a spool 34 (FIG. 1) through suitable guides to the winding mandrel 21. At the mandrel 21, the lateral wire 13 is fed between the peening roller 31 and the mandrel 21, and is peened into notches (not shown) formed in the side rods by the notching roller 30, and is wound on the side rods as the mandrel and side rod stock are rotated.

Means are provided for severing the grid lateral wire 13 between groups of turns on the side rod stock 14 and 15 and for facilitating the picking up of the free end of the wire 13 to initiate the winding of a group of turns. This means is further described in a copending U. S. patent application of John A. Chase, Serial No. 632,079, filed January 2, 1957, now Patent No. 3,037,533, and assigned to the assignee of this application. This severing means includes, essentially, a pair of members (gripping jaws) 35 and 36 (FIG. 2) constituting a gripping jaw and positioned adjacent to the winding mandrel 21 and between which the grid lateral wire 13 passes to the mandrel. Means (not shown) are provided for closing the jaw members 35 and 36 and thereby tightly gripping the grid wire 13 so that continued rotation of the winding mandrel 21 causes the wire to break at the region of the final peen. This follows from the aforementioned disposition of the peening roller 31 above the mandrel. The notching and peening rollers 30 and 31, respectively, are preferably retracted from their operative position adjacent to the winding mandrel only after the grid wire break-off operation described. After a break-off operation, the gripping jaw 35 and 36 moves back (direction A) to retract the free end portion of the grid lateral wire 13 and to thereby dispose the free end portion of the wire in desired position between the retracted peening roller 31 and the mandrel 21 in readiness for the winding of the next series of grid turns to form the next grid. This reduces length of a tail normally produced when the free end portion of the lateral wire extends appreciably beyond the adjacent side rod. When it is desired to initiate the winding of the next group of grid wire turns, the notching and peening rollers are returned to their operative positions and the wire 13 at a portion thereof closely adjacent to its free end is peened into a first notch in a side rod which comes into contact with the peening roller. After the winding of the next grid has started the gripping jaw 35 and 36 moves forward (direction B) into the position shown in FIG. 2.

Since the relatively fine grid lateral wire 13 is fed from a spool 34 (FIG. 1) having a fixed axis (as distinguished from prior art arrangements wherein the lateral wire spool rotates about the side rod stock) the length of wire between the spool and the notching and peening rollers is relatively long. Consequently, the strain imparted to the unspooled lateral wire, when the winding of each group of lateral wire turns is initiated, is borne by a relatively large amount of lateral wire. The resultant lower strain per unit length of lateral wire enables the use of high winding speeds (for example, at the rate of 1500 lateral wire turns per minute as distinguished from a peak rate of about 1000 turns per minute in the aforementioned prior art arrangements) and extremely fine lateral wire without danger of breaking the lateral wire.

Also, since the lateral wire spool does not rotate about the side rod stock, large spools of lateral wire may be used so that the automatic machine may be run for relatively long periods of time between reloading intervals.

When the grid wire is picked up at the beginning of the winding operation, a small tail 37 (FIG. 11) of the grid wire projects laterally from the first turn of each series of grid wires. This tail is disposed by bending around the adjacent side rod, as will be explained below.

Grid Strip Feeding Mechanism

As the grid strip 11 is formed, it is drawn longitudinally to the left (FIGS. 1 and 2) by a grid strip feeding mechanism. The grid strip feeding mechanism (FIGS. 1 and 4) includes two heads (78 and 80) of four similar heads 78, 80, 82, and 84. The two feed mechanism heads 78 and 80 include rotating means for gripping the rotating grid strip as it is formed and feeding it in a linear direction (to the left of FIGS. 1 and 4). The two heads are independently mounted in a manner to be described below and are driven in such a way that they reciprocate (substantially 180°) out of phase with each other, as illustrated in the timing diagram shown in FIG. 23.

Details of One Head of the Grid Strip Feeding Mechanism

Since the two heads 78 and 80 are similar in structure, only the first head 78 will be described in detail. Portions of the first head 78 are shown in FIGS. 5 to 13 inclusive. These figures will now be referred to in connection with a consideration of the various aspects of the construction and operation of the head. The first head 78 comprises a housing 86 having openings 88 and 90 at a lower portion thereof through which extend first and second reciprocating shafts 49 and 50 to be described. The housing 86 is provided with slots 92 and 94 which extend inwardly from its rear and front faces, 91 and 93 respectively, to the openings 88 and 90, respectively. A bushing 97 is secured in the first shaft bore 88 by a bolt 98 which extends across the slot 92; the shaft 49 slides in the bushing 97. Another bolt 96, which extends across the slot 94, secures the housing 86 (and thus the head 78) to the second shaft 50.

While the first head 78 is locked to the second shaft 50 and is slidable on the first shaft 49, the second head 80 (FIG. 4), is mounted for asynchronous movement with respect to the first head in a manner described below. Thus, the second head 80 is locked to the first shaft 49 and is slidable on the second shaft 50 and the first head 78, is locked to the second shaft 50 but is slidable on the first shaft 49.

In the first head 78 (FIG. 5) an upper portion of the housing 86 is provided with an opening 100 through which extends a spline shaft 38. The housing 86 is provided with a spline sleeve 102 which extends through the housing and is secured thereto. This arrangement allows the spline sleeve 102 (and thus the head 78) to move in a longitudinal direction with respect to the spline shaft 38. The spline sleeve 102 rotates in suitable spaced-apart ball bearings 108 and 110 (FIG. 10). A driving gear 112 (FIG. 10) is fixed to the spline sleeve 102 between the bearings.

A hollow spindle 114 (FIG. 8), having a bore 115, is axially aligned with the grid strip 11 and is rotatably mounted in the housing 86 (FIG. 5) adjacent to and parallel with the spline shaft 38. The spindle 114 (FIG. 8) is mounted in suitable spaced-apart ball bearings 116 and 118 and carries a driven gear 120 which meshes with the driving gear 112 as shown in FIG. 10. The spindle 114 (FIG. 8) extends along the entire length of the housing 86 and has a tubular sleeve 122 secured thereto at the left or outlet end of the spindle. The sleeve 122 has a bore 123 which is only slightly larger in diameter than the grid strip 11 and thereby acts as a guide for the grid strip as it passes through the spindle 114.

The grid strip inlet end of the spindle 114 (the right end of the spindle in FIG. 8) includes a disk-like portion 124 (FIG. 7) having front and rear surfaces 126 and 128, respectively. A ring gear 130 is rotatably mounted in a bearing 132 disposed on the periphery of the spindle disk portion 124. The front surface 126 (FIGS. 5 to 8) of the disk portion 124 includes raised semi-circular portions 134 and 136 having adjacent parallel edges 138 and 140 spaced apart to define a channel 142 (FIG. 7) between them. Upper and lower slide plates 144 and 146 are adapted to slide toward and away from each other in the channel 142. The slide plates 144 and 146 are held in the channel 142 by a pair of gibs 148 and 150 secured to the semi-circular portions 134 and 136, respectively. The slide plates 144 and 146 are radially aligned on opposite sides of the axis of the spindle 114 and at their opposite ends they carry rollers 152 and 154 (FIG. 8), respectively, on shafts 156 and 158, respectively, which have eccentric adjustment flanges 160 and 162, respectively, on their free outer ends for adjustment of the rollers.

Slide cams 164 and 166 (FIG. 7), adapted to cooperate in cam drive relationship with the rollers 152 and 154, are mounted on the ring gear 130 at diametrically opposite positions thereon. The slide cams 164 and 166 (FIGS. 7 and 8) include substantially planar cam surfaces 168 and 170, respectively, which are oriented parallel to each other and at an angle to the horizontal (in FIGS. 7 and 8) and in contact with the rollers 152 and 154.

Adjacent ends of the slide plates 144 and 146 (FIG. 7) have spaced-apart legs 176, 178, and 180, 182, respectively. One spring 181 is provided between one set of opposed legs 176 and 180 and a second spring 183 is provided between the second set of opposed legs 178 and 182. The ends of the springs are inserted in suitable slots in the legs and serve to bias the slide plates apart.

The slide plates 144 and 146 include means for gripipng the grid strip. This means (FIGS. 8, 11, and 12) comprises an upper gripping member 184 and a lower gripping member 186. The upper gripping member 184 is secured to the legs 176 and 178 of the upper slide plate 144 and extends across the space between those legs; the lower gripping member 186 is secured to the legs 180 and 182 of the lower slide plate 146. If desired, an upper swedging tool 184a may be substituted for the member 184, to cut into the side rods so as to provide spaced swedges or notches (not shown) in the rods. These notches facilitate the positioning of mica spacers on the side rods during assembly of a tube. In order to realize this notching, the gripping surface 193 of the upper gripping member 184a may be provided with two laterally spaced-apart grooves 188 and 190 (FIG. 11), in the form of inverted V's, which are adapted to centralize the side rods 14 and 15 when the gripping member 184a engages the grid strip 11 in a swedging action.

The second and third heads 80 and 82 (FIG. 4) have gripping members 185 and 187 (FIG. 16) which do not swedge or notch the side rods. Member 185 is similar to member 184 above described. Consequently, these gripping members 185 and 187 have straight gripping surfaces 189 and 191, respectively.

The upper gripping member 184 of the first head 78 (FIGS. 8 and 11) is positioned within a generally U-shaped hold-down member 192 (FIGS. 7 and 8). The hold-down member 192 is held in place by a spring 194, the spring being biased by a wedge 196 secured in position by a stud retainer 198. The stud retainer 198 is bolted to the upper slide plate 144 and serves to secure both the upper eccentric roller adjustment flange 160 and the wedge 196 in position. The hold-down member 192 is thus freely movable with respect to the upper gripping member 184 and assists in the operation of the gripping member. For example, when the slide plates 144 and 146 are spaced apart in their open positions (FIG. 16), a lower-most portion of the hold-down member 192 extended below the gripping surface of the gripping member 184 or 185 so that when the side rods 14 and 15 of a grid strip are gripped, first the lower-most hold-down member portion engages the side rods and then the gripping member. During the gripping period, the hold-down member 192 provides a balancing force on either side of the gripping member 184 or 185 and helps to prevent bending of the side rods 14 and 15 about the gripping region. In addition, when the grid strip is released, the hold-down member 192 promotes removal of the gripping member 184 or 185 from the grid strip by pushing the grid strip away from the gripping member.

The lower gripping member 186 (FIGS. 8 and 11) comprises a generally rectangular plate extending across the space between the legs 180 and 182 of the lower slide plate 146. The lower gripping member 186 is provided with a planar gripping surface 200 which has the same transverse extent as that of the gripping surface 193 of the upper gripping member 184 (184a or 185).

Means are provided for wrapping the aforementioned grid lateral wire tail 37 (FIG. 11) around a side rod. This tail 37 projects from one of the side rods at the start of the first turn of each group of turns of grid lateral wire. It is desirable to eliminate or displace the tail 37 since, if it were allowed to remain, it might cause a short circuit in the completed tube. A tail displacing means comprises a thin plate 204, fixed to the lower gripping member 186, and having a grooved portion 206 and positioned adjacent to the leg 182 of the lower slide plate 146. The grooved portion 206 faces the upper gripping member 184; the groove in the portion 206 is adapted to receive the side rod 15 of the grid strip from which the tail 37 projects. As the slide plates close, the wire tail 37 follows the wall of the groove and is bent clockwise (FIG. 12) around the side rod 15.

As shown in FIG. 9, means are provided for limiting the rotation of the ring gear 130 with respect to the spindle 114 and to thereby determine the position of the slide plates 144 and 146 in their open position, that is, in the position away from each other. This limiting means includes a plate 212 secured to the ring gear 130 and adapted to engage a stop pin 214 projecting from the rear face 128 of the disk-portion 124 of the spindle 114.

Means are also provided for locking the upper and lower slide plates 144 and 146 in their closed position (the position in FIGS. 5 and 12). This means (FIG. 9) includes a pawl 216 and a latch plate 218 mounted on the rear face 128 of the spindle 114. The pawl 216 is pivotally mounted on a pin 210 fixed to the ring gear 130. A spring 220 biases the inner end 222 of the pawl 216 inwardly into locking engagement with the end of the latch plate 218. When the pawl 216 is thus locked, its other end 224 projects outwardly of the ring gear so that the pawl may be tripped. The tripping mechanism comprises a rotatable arm 226 (FIGS. 5 and 6) pivotally mounted on the housing 86 and adapted to be pivoted into and out of tripping position by a solenoid 228. A spring 230 (FIG. 9) is also connected at one end 231 to the ring gear 130 and at the other end 233 to the spindle 114 to cause the gear and spindle to rotate relative to each other and to thereby allow springs 181, 183 to bias the slide plates 144 and 146 open (as shown in FIGS. 6 and 11) after the pawl 216 has been released.

Means are provided for controlling the relative spacing of the slide plates 144 and 146 (FIG. 7) in their closed position. This means includes an arm 232 mounted on one gib 148. The arm 232 supports an adjustable screw 234 adapted to strike a stop 236 fixed to the ring gear 130 to determine the maximum rotation of the ring gear in the counter-clockwise direction in the position shown in FIG. 7.

The head 78 also includes a conventional electro-magnetic brake 237 (FIG. 13) mounted within the housing 86. The brake 237 includes a coil 238 having a rotatable armature 240 provided with a shaft 241 which extends out of the housing 86. The shaft 241 carries a brake gear 242 which meshes with the ring gear 130 (FIG. 5).

Means are provided for actuating the elements of the head 78. Thus, at a selected moment a first cam 45 of several cams 45 (FIG. 22) on a rotating cam shaft 44 strikes a first switch 47 of several switches 47, which energizes the electromagnetic brake 237. When the brake 237 is energized, it slows down the rotation of the brake shaft 241 and its brake gear 242 which in turn tends to slow the rotation of the ring gear 130. Consequently, the spindle 114 now rotates faster than the ring gear 130, and the rollers 152 and 154 (FIG. 8) secured to the slide plates 144 and 146 ride along the cam surfaces of the cams 164 and 166 secured to the ring gear 130. As the rollers 152 and 154 follow the cam surfaces, the slide plates 144 and 146 (FIGS. 11 and 12) and their gripping members 184 and 186 move toward each other to first cause the lower gripping member 186, the hold-down member 192, and the upper gripping member 184 to contact the grid strip. As the relative rotation (FIGS. 5 and 6) of the spindle 114 and ring gear 130 continues through a relatively small arc, the gripping members reach a point where they firmly grip the grid strip. At this point, the latch plate 218 (FIG. 9) carried by the spindle 114 slides past the inner end 222 of the pawl 216 carried by the ring gear 130. The inner end 222 of the pawl 216 its depressed by the spring 220 so that the inner end of the pawl locks against the latch 218 (FIG. 7). At the same time, the screw 234 on the gib 148 strikes the stop 236 to limit the movement of the slide plates toward each other. This limitation of movement limits the extent to which the notches 188 and 190 of the upper gripping member 184 penetrate the side rods. This stop arrangement insures uniform depth of penetration of the upper gripping members into the side rods. After this penetration is completed, the electromagnetic brake 237 (FIG. 5) is de-energized.

The ring gear 130 which is locked to spindle 114, now rotates with the spindle.

The closed position of the slide plates 144 and 146 (FIG. 6) and the gripping members is controlled by the end positions of the rollers on the cams 164 and 166. This closed position may be varied by adjustment of the eccentric shafts 156 and 158 (FIG. 8) which carry the rollers 152 and 154.

In order to open the gripping members, a switch is actuated by a second cam 45 (FIG. 22) on the cam shaft 44 which in turn actuates a second switch 47 controlling the solenoid 228 (FIG. 5) coupled to the arm 226. The arm 226 is rotated counter-clockwise into the position shown in FIG. 6 where it is positioned to trip the pawl 216 as the spindle 114 and ring gear 130 rotate clockwise and bring the pawl into tripping engagement with the arm 226. When the pawl is tripped, its inner end 222 (FIG. 9) moves outwardly releasing the latching plate 218. The spring 230 (FIG. 9) then causes the ring gear 130 to rotate at a slightly faster rate than that of the spindle 114 with the result that the rollers 152 and 154 (FIG. 8) return to their initial positions against the cams 164 and 166 (FIG. 6) and the slide plates 144 and 146 fly apart (as shown in FIGS. 6 and 11) and release the gripping members 184 and 186 from the grid strip.

*Grid Stretching Mechanism*

The second and third heads 80 and 82 (FIGS. 1 and 4) are adapted (1) to transport the grid strip 11 in a direction to the left along the apparatus and toward the end thereof and (2) to stretch the grid strip to remove any bends or strains that might occur therein. The two heads 80 and 82 are similar to the first head 78 already described. However, as indicated before, while the first head 78 is fixed to the second reciprocating shaft 50, the second head 80 is fixed to the first shaft 49, and the third head 82 is mounted for free sliding on both shafts 49 and 50 but is tied to the second head 80 in a manner to be described. Referring to FIG. 4, the second and third heads 80 and 82 include housings 244 and 246, respectively. The spline shaft 38 passes through each of the housings 244 and 246. The upper portions of the housings 244 and 246 above the spline shaft 38, are provided with axially aligneod bores 248 and 250, respectively. A first threaded nut 252 is fixed in the bore 248 of the second head 80 and a second threaded nut 254 is fixed in the bore 250 of the third head 82, the two threaded nuts being positioned adjacent to each other. A first right and left hand screw link 256 is mounted in the bores 248 and 250 with the right hand and left hand threaded portions 258 and 260 engaging, respectively, the right and left hand threaded nuts 252 and 254.

The second and third heads 80 and 82 (FIG. 4) are also provided with a second pair of axially aligned bores 262 and 264 respectively. Third and fourth threaded nuts 266 and 268 are fixed in the bores 262 and 264, and are connected to a second right and left hand screw link 270 having right and left hand threaded portions 272 and 274, respectively. When the screw links 256 and 270 are rotated in one direction, the heads are driven away from eacho ther and when the links are rotated in the opposite direction, the heads are driven toward each other.

The apparatus (FIG. 4) for automatically rotating the links 256 and 270 includes a solenoid 276 mounted on the third head 82 by means of a bracket 278, and adapted to produce rotary motion. Solenoids of this type are commercially available, and description thereof is not believed to be necessary herein. The solenoid 276 includes a rotatable shaft 280 to which is fixed one end of an arm 282. The other end of the arm 282 is fixed to a turnbuckled arm 284 one end of which is adjustably fixed in a slot 286 in a bell crank 288 which is pivotally mounted on the first screw link 256. A third link 292 is pivotally secured at one end to the bell crank 288 and at the other end to a second arm 294 secured to the second screw link 270. A control arm 296 is secured to the second screw link 270 between the second and third heads 80 and 82 in cooperative relation with a stop plate 298. A bracket 306 (FIG. 15) is mounted on the housing 246 and carries a spring 308 against which a plunger 310 bears. The plunger 310 is oriented facing the bell crank 288 so that the bell crank is adapted to strike the plunger. This resilient stopping arrangement limits the clockwise rotation (FIG. 14) of the bell crank 288 during the stretching operation and later urges it to rotate counter clockwise (FIG. 14) towards the normal or unstretched position (FIG. 15).

The position of the members of the apparatus during the application of a stretching force to the grid strip 11 is illustrated in FIG. 14. The position of the members in a partially relaxed position to be described is illustrated in FIG. 15. The stretching of the grid strip 11 by the second and third heads 80 and 82 is effected during a time interval when both heads are moving to the left (FIG. 4). With the gripping mechanism closed and gripping the grid strip, a third cam 45 (FIG. 22) on the cam shaft 44 closes a third switch 47 energizing the solenoid 276 (FIG. 15). Then the solenoid shaft 280 rotates clockwise (FIG. 15) from the position shown in FIG. 15 to the position shown in FIG. 14. This rotation is transmitted to the first and second screw links 256 and 270 which are rotated counter-clockwise (FIG. 15). The control arm 296 also rotates counter-clockwise (FIG. 15) and is raised above the surface 300 of the stop plate 298. Since the screw links 256 and 270 carry oppositely threaded portions engaging the nuts 252, 254, 266, and 268, the second and third heads 80 and 82 are spread apart (for example, a distance of the order of .025 inch) when the links rotate. This spreading of the heads applies a stretching force to the grid strip. After the heads have been spread apart, the solenoid 276 is deenergized.

The spring 308, and a spring, not shown, within the solenoid 276, which bias the screw links 256 and 270 in a direction opposite the direction of the solenoid actuation, urge the links 256 and 270 to rotate clockwise (FIG. 15) or "back up" about 40% of the way back to the unstretched position; at this point the control arm 296 contacts the upper surface 300 of the stop plate 298. When the control arm 296 and the plate 298 are in contact, the tension due to the stretching operation is relieved. At this point in the stretching operation, the grid strip is released from heads 80, 82. As has been indicated above, the heads 80, 82 move to the left (FIG. 4) throughout the stretching and partial release aforementioned. The control arm 296 remains on the stop plate surface 300 until (see FIG. 23) after the second and third heads 80 and 82 have ceased moving to the left and have moved an appreciable distance to the right. Then the control arm 296 falls off the upper surface 300 of the stop plate 298. When the control arm 296 disengages from the stop plate 298 the screw links 256 and 270 rotate clockwise (FIG. 15) a further amount separating the heads 80 and 82 by their normal spacing. The "backing-up" of the heads by about 40 percent before the release of the grid strip from the gripping members relieves the tension in the side rods due to residual elasticity in the side rods. Thus, the side rods are preserved from the scratching and scoring that might otherwise occur if the rods were released from the gripping members while under tension.

Grid Severing Mechanism

The fourth head 84 (FIG. 4) houses the cutting mechanism of the machine 10 and is employed for cutting the grid strip 11 into individual grids. As has been indicated above, the fourth head 84 is slidably mounted on the first reciprocating shaft 49 and is fixed to the second reciprocating shaft 50. The fourth head 84 includes a housing 312 which includes an operating mechanism similar to that in the first head 78 except that in the fourth head the spindle is reversed in direction and faces to the left (FIG. 4) rather than to right and, in addition, the upper and lower slide plate, 314 and 315, respectively, carry cutting means rather than gripping or swedging means. Referring to FIGS. 17, 18, and 19, the fourth head carries an upper cutting member 316 having a cutting edge 318. The cutting edge 318 is provided with a pair of V-shaped notches 320 and 322 positioned to receive the side rods 14 and 15 of the grid strip. A U-shaped hold-down member 323 (FIG. 19) straddles the upper cutting member 316. The head also carries a lower cutting assembly comprising an anvil 325 having a top surface 326 which is provided with two V-shaped notches 328 and 330 vertically aligned with the notches 320 and 322, respectively, of the upper cutting member 316. The anvil or lower cutting member 325 also includes a central transverse channel 332 (FIGS. 18 and 19) which is adapted to receive the leading cutting edge 318 of the upper cutting blade 316 whereby a slug 333 is cut out of the side rods between grids to sever the grids from the grid strip. The channel 332 communicates with a chute 334 (FIG. 19) through which the slugs are fed into a slug tray 336 which is suitably, removably secured to the housing 312.

Since the cutting member 316 and the anvil 325 rotate with the fourth head 84, it is of prime importance that the slug 333 be disposed of in such a way as not to interfere with the operation of the apparatus. If this slug were not restrained after severance or controlled in its movement with the slug tray after severance there is danger that it might become lodged in operating portions of the apparatus with consequent damage thereto. Therefore, according to the invention, means are provided for desirably controlling the movements of the cut slug 333.

This means may comprise a baffle 337 (FIGS. 18, 19 and 20) fixed in the channel 332, and having two passageways 338, 339 (FIG. 20) converging to a passageway 340 commouuicating with the chute 334. Each of passageways 338, 339 is of a size for snugly receiving a slug 333 after severance and restraining all movement thereof except in response to a pushing force produced by a subsequent cut slug. The aforementioned restraint is sufficient to overcome the centrifugal force of a slug during rotation with head 84.

After a slug 333 is pushed through passageway 340, it freely enters chute 334. This chute, however, also rotates with head 84, so that a slug dropped thereinto leaves chute 334 at an appreciable velocity and in random directions. In order to control the movements of a cut slug 333 after it leaves chute 334, there is provided in accordance with the invention a fixed baffle housing 342 (FIG. 19) which has a side opening 344 to receive chute 334 and provide desired clearance for the same during rotation of the head 84. The baffle housing 342 is provided with a bottom opening 347 connecting with slug tray 336. The baffle housing 342 serves to confine the movement of a slug 333 issuing from the rotating chute 334 and to direct its movement into the slug tray aforementioned.

Vernier-type means (FIG. 21) is provided for longitudinally positioning the fourth head 84 on the reciprocating shaft 50 so that the length of the grid cut from the grid strip may be accurately controlled. This means includes a bracket 341 fixed to the shaft 50. A screw 343 is fixed to the housing 312 and the bracket 341 is slidably coupled to the screw. A manually operable adjusting nut 345 is mounted on the bracket 341 and is threaded on the screw 343 so that rotation of the adjusting nut drives the screw and the housing to which it is fixed and determines the position of the housing along the shaft 50.

In operation of the cutting mechanism, the grid strip is fed into the fourth head 84 (FIG. 4) between the open upper and lower cutting members 316 and 325 (FIG. 17) so that portions of the side rods 14 and 15 between groups of grid wire turns are aligned with the V-shaped notches 320, 322, and 328, 330. As the cutting members are brought together, the lower member and the hold-down member 323 first contact the grid strip and hold it while the cutting member 316 comes down and bears against the two side rods and penetrates into the central channel of the lower cutter 325 whereby slugs are cut out of the side rods and the cut grid drops downwardly through a chute 350 (FIG. 19).

In order to produce grids with side rods having prismoidal ends 346 and 348 (FIG. 19), for easier insertion of the grid legs through electron tube spacer plates, the upper and lower cutting members 316 and 325 are constructed with longitudinally spaced apart forming surfaces to simultaneously, independently shape the trailing 348 and lead 346 side rod ends during a single closing of the upper and lower slide members 314 and 315. To this end, the lower cutting member 325 is provided at each notch 328, 330, with inwardly extending ridges 349 of conical cross-section, and the upper cutting member 316 is provided with lateral recesses 351, 352 having a shape for receiving the ridges 349 (FIG. 19). Therefore, when the upper and lower cutting members are brought together, two cuts are effected in each of the side rod stocks 14, 15. The two cuts follow the conical cross-sections of the ridges 349 to provide pointed ends on the cut grids. In addition to this function, the ridges 349 provide interlocking engagement between the cut slugs 333 and the cutting member 325, which prevents the slugs from returning to the open end of the channel 332.

The slugs 333 aforementioned, representing the portions of the grid side rod stock between the trailing and leading end forming surfaces, are produced as a consequence of this forming operation. While the leading and trailing side rod ends produced by the longitudinally spaced apart forming surfaces are described as having similarly shaped prismoidal ends, it will be appreciated that, if desired, the leading and trailing ends may be provided with contours different from each other by the use of suitably shaped cutting member forming surfaces.

The aforementioned structure of the cutting members 316 and 325 which results in the formation of a slug 333 is characterized by an additional advantage. As shown in FIGS. 24 and 25, the action of the grippers 184, 186 of heads 78, 80 and 82, is such as to cause partial entrance of the gripping members 184 into the material of side rod stock 15. This partial entrance produces recesses 352, in the stock. In addition, the lower gripping members 186 in heads 80, 82 have a recess 354 which produces an embossment 356 in the side rod stock. This deformation of the side rod stock produces an interlock between the side rod stock and the heads 78, 80, 82 which is desired to positively restrain relative movement between the side rod stock and the heads aforementioned during the time that the heads grip and move the side rod stock. This interlock is particularly important at heads 80, and 82, between which the above described stretching operation takes place. Therefore, at these heads the lower gripping members 186 are provided with recesses 354 aforementioned, for further increasing the restraint to relative movement between these heads and the side rod stock.

But while the deformations 352 and 356 in the side rod stock are therefore of advantage in the respect indicated, they are objectionable if permitted to remain in a finished grid. This is so even though they extend along a relatively short length of grid side rod stock that is free of lateral wire. Consequently, a removal of the deformed portions of the grid side rod stock is desirable. To accomplish such removal, the action of the apparatus is such as to dispose successive deformed regions of the side rod stock between the opposite elements of the lower cutting member 325 as shown in FIG. 24. The cuts produced will then be along dotted lines 358, 360 shown in FIG. 25, so that the slug portion will include the aforementioned deformed portions of the side rod stock. Therefore, the finished grids 362 (FIG. 1) will be free from the deformations referred to.

*Common Driving Mechanism*

The apparatus 10 includes a driving mechanism (FIGS. 1, 2, and 22) for driving and correlating the various operations of the apparatus. As previously indicated, the motor 27, which comprises the primary power source for the apparatus, is coupled to the hollow shaft 20, preferably through a clutch (not shown). The shaft 20 (FIG. 2), in turn, transmits power to the spline shaft 38 through suitable power transfer gears 39 and 40. The spline shaft 38 is disposed parallel to the hollow shaft 20 and to the grid strip 11 and extends along the apparatus.

The shaft 20 (FIG. 2) is also provided with a timing chain drive sprocket 41 which is coupled by a timing chain 42 through a suitable first gear box 43 to a cam shaft 44 (FIG. 22) which carries a plurality of cams 45 adapted to co-act with a plurality of switches 47 referred to before herein, to automatically control the various operations of the apparatus. The gearing arrangement in the first gear box 43 is such that the cam shaft 44 rotates once each time during the time that one grid is formed. The cam shaft 44 is oriented parallel to the hollow shaft 20 and spline shaft 38.

At the left hand end of the machine, as seen in FIGS. 1 and 22, the cam shaft 44 is coupled to a right angle drive gear box 48 which carries a shaft 46 oriented at right angles to the cam shaft 44. The right angle shaft 46 carries a pair of drive cams 57 and 58 which control, respectively, the movements of the two reciprocating shafts 49 and 50. The two shafts 49 and 50 are adapted to reciprocate longitudinally and are disposed parallel to the cam shaft 44. The first reciprocating shaft 49 is slidably mounted in one set of bearing blocks 51 and 61 and the second reciprocating shaft 50 is slidably mounted in another set of bearing blocks 52 and 62.

The drive cams 57 and 58 are coupled to the reciprocating shafts 49 and 50, respectively, through cam rollers 54 and 60, respectively, fixed to brackets 53 and 56, respectively. The rollers 54 and 60 bear against the cams 57 and 58 under the influence of springs 64 and 66 which are mounted on the free left hand ends (FIG. 22) of the reciprocating shafts 49 and 50, respectively. The springs are each held in position between a plate 68 and one of two collars 70 and 72 fixed to the shafts 49 and 50, respectively.

The drive cams 57 and 58 each have cam surfaces such that as the cam rollers 54 and 60 follow their surfaces, the shafts 49 and 50 reciprocate in a horizontal plane. During the greater portion of their reciprocating paths of travel, the shafts 49 and 50 move out of phase with each other. However, to insure smooth operation of the machine, for a short period of time when the shafts are near the ends of their linear paths of travel in the direction to the left, they move together in the same direction. The drive cams 57 and 58 alternate in controlling the pitch of a group of grid lateral wire turns on the grid strip. The lateral wire turns are wound as the shafts 49 and 50 move to the left, under the control of the drive cams 57 and 58 and the rollers 54 and 60. Movement of the shafts to the right is effected, essentially, by the springs 64 and 66 and occurs between successive periods during which lateral wire is wound.

Operation of the Apparatus

Before the apparatus 10 is turned on, the grid side rod stock 14 and 15 (FIGS. 2 and 3) is threaded through the hollow shaft 20 and along the mandrel 21 and is drawn longitudinally through all four heads 78, 80, 82, 84. The lateral wire is then secured to the side rods by manually turning the apparatus.

The apparatus 10 is then turned on so that the hollow shaft 20, the spline shaft 38, the cam shaft 44, and all of the spindles in the heads 78, 80, 82, and 84 are rotating and the reciprocating shafts 49 and 50 are properly reciprocating under the control of the drive cams 57 and 58. At this time, the notching and peening rollers 30 and 31 are in operative relation with the winding mandrel 21 so that as the mandrel rotates, and the grid side rod stock rotates, notches are cut in the side rod stock by the notching roller 30. The grid lateral wire, which has been threaded through the break-off jaws 35 and 36 and between the peening roller 31 and the winding mandrel 21 is peened into a notch by the peening roller. As soon as the grid lateral wire is peened into a notch, the rotation of the mandrel 21 causes turns of the lateral wire to be wound on the side rods. The winding of the grid lateral wire on the side rods and the formation of the grid strip is now effected under the control of the four heads 78, 80, 82 and 84.

As illustrated in FIG. 23, in the apparatus no potentially disturbing operations are performed during the time that the grid lateral wire is being wound, that is, none of the heads are opened or closed while the lateral wire is being wound. This is done to reduce to a minimum all possible opportunities for disturbing the accuracy of winding operation. The second and third heads 80 and 82 are timed to perform their stretching operation during the time following the completion of winding of one set of grid wires and before the winding of the next set is begun. Also, the fourth head 84 is timed to perform its cutting operation during the time when the machine is not winding a set of grid wires.

In operation of the apparatus 10 (FIG. 1), the shafts 49 and 50 reciprocate longitudinally out of phase with each other under the control of the drive cams 57 and 58 which are coupled to the shafts 49 and 50 through the cam rollers 54 and 60. Thus, the movements or the phase of the various heads relative to each other are determined by the shafts to which they are coupled.

Reference is now made to the chart of FIG. 23 in describing the sequence of operations of the four heads 78, 80, 82, and 84. For convenience, a cycle of operation is chosen commencing at a time when the first head 78 is in its extreme return position (that is with the head 78 positioned to the extreme right when the apparatus is oriented as shown in FIG. 1) and terminating at a time when the head returns to this return position.

In the extreme return (right) position of head 78 referred to, the first head 78 and fourth head 84, which are open, are about to move forward (that is, to the left as viewed in FIG. 1); at this time the second and third heads 80, 82, are closed, and are moving forward, and have just started a stretching operation. At a succeeding interval of time the first and fourth heads 78, 84, close, the first head 78 gripping side rod stock while the fourth head 84 severs a finished grid from the grid strip; during interval C–D all of the heads are moving forward and the second and third heads 80, 82, continue to hold the grid strip in stretched position. During this interval, head 84 opens. This occurs immediately after the grid strip is cut or severed. At time D, the stretching ceases and the partial release commences. Then, at time E, the second and third heads 80, 82, open. Then, at time F, the second and third heads reach their extreme forward positions and start their return movement. During their return movement, the second and third heads 80, 82 go through a time G at which the heads return to their full unstretched position. Then, after the second and third heads 80, 82, reach their extreme return position, at H, these heads start to travel forward and soon close, at time J. The first and fourth heads, still traveling forward, now open, at time K. Then, after opening, the first and fourth heads reach the forward position, at time L, whereupon they start their return travel. When the first and fourth heads 78, 84 reach their extreme return position, the cycle is ended. During a portion of the cycle from time F or shortly thereafter and to a time shortly before time H, grid lateral wire is wound on the grid side rod stock. The remainder of the cycle, during which no grid lateral wire is being wound is provided, for assuring a desired unwound portion at a region of the side rod stock to serve as grid legs.

From the foregoing, it is seen that the invention provides improved grid winding apparatus adapted to continuously and automatically manufacture wound grids.

What is claimed is:

1. A grid winding apparatus comprising support means defining a predetermined path, a grid lateral wire feeding device spaced laterally from said path, said support means including two gripping members spaced along said path and from a plane normal to said path and including said feeding device, a first drive means for rotating said support means on an axis in and parallel to said path, a second drive means for moving one of said gripping members rectilinearly a predetermined distance and in one direction parallel to said path while said support means is rotated, and a third drive means for moving the other of said gripping members in said direction while said one of said gripping members is restrained from rectilinear movement only, whereby grid side rod stock carried by said support means is adapted to be advanced in said path while rotating for receiving grid lateral wire from said feeding device.

2. Apparatus of the kind described, comprising a support defining a predetermined path, a grid lateral wire feeding device spaced laterally from said path and adapted to feed grid lateral wire to said path, said support including two gripping members spaced along said path and from a plane transverse to said path and including said feeding device and adapted to feed grid side rod stock along said path, a first means connected to said support for rotation of said gripping members on an axis in and parallel to said path, a second means connected to one of said gripping members for moving it in one direction parallel to said path, a third means connected to said second means and to the other of said gripping members for moving it a predetermined distance in said direction greater than the distance traveled by said one member, and a fourth means connected to said gripping members for continuously actuating said gripping members into a side rod gripping position during a movement of said at least one of said members in said direction, whereby said side rod stock is adapted to continuously advance in said path while rotating for receiving a winding of grid lateral wire thereabout, said gripping members being adapted to engage opposite terminal regions of a wound strip portion, whereby said strip portion is stretched between said gripping members.

3. Grid winding apparatus comprising side rod stock support means adapted to support and guide side rod stock in a rectilinear path, a first power transfer means connected to said support means for rotating the same on an axis including a portion of said path, grid lateral wire feed means disposed adjacent to a portion of said path and adapted to feed grid wire toward said path, said support means including two gripping members spaced along said axis from each other and spaced from said feed means, each of said gripping members being actuatable to a side rod stock gripping position, a second power transfer means connected to one of said gripping members for actuating it to its gripping position and moving it along said path and in a direction away from said feed means, whereby said one member is adapted to grip and move said side rod stock past said grid wire feed means for winding grid wire thereon, and a third power transfer means connected to the said other of said two members for actuating it to its gripping position and moving it along said path in the same direction and at the same velocity as said one member, said second and third power transfer means being asynchronously operative to intermittently actuate said members with at least one member being actuated at all times, whereby said side rod stock is fed continuously past said grid wire feed means for continuously winding a grid strip of any desired length.

4. A grid winding apparatus comprising support means defining a predetermined path, a grid lateral wire feeding device spaced laterally from said path, said support means including two gripping members spaced along said path and from a plane including said feeding device, a first drive means for rotating said support means on an axis in and parallel to said path, a second drive means for moving one of said gripping members a predetermined distance and in one direction parallel to said path, and a third drive means for moving the other of said gripping members in said direction while said one of said gripping members is restrained from movement, whereby grid side rod stock carried by said support means is adapted to advance in said path while rotating for receiving grid lateral wire from said feeding device, said support means further including a third gripping member connected to said second gripping member for movement in said path therewith, and grid stretching means connected to said second and third gripping members to move them apart during a movement of said second and third members in said direction and while said second and third members are in gripping positions.

5. In a grid winding machine, a pair of spaced apart, parallel shafts, drive means connected to said shafts for moving them in directions along their long axes out of phase with each other, a first operating member fixed to one of said shafts and slidably mounted on the other of said shafts, a second operating member slidably mounted on said one of said shafts and fixed to the other of said shafts, a third operating member fixed to said second member and slidably mounted on both of said shafts, means secured between said second and third members for moving said members apart, a fourth operating member fixed to said one of said shafts and slidably mounted on the other of said shafts for movement in synchronism with said first member, said operating members being aligned on a common axis, and rotating means connected to each of said members for continuously rotating said members about said axis.

6. Grid making apparatus comprising a rotatable mandrel adapted to support grid side rod stock, drive means connected to said mandrel for continuous rotation thereof, feed means adjacent to said mandrel adapted to feed grid lateral wire to said mandrel for producing grid strip, grid strip feed means spaced from and axially aligned with said mandrel and adapted to engage said strip for feeding said strip continuously away from said mandrel, said strip feed means including two spaced gripping heads having rotatable members adapted to asynchronously grip said strip, said gripping heads being asynchronously moveable in a path axially aligned with said mandrel, said drive means connected to said members for rotating said members and mandrel in unison, whereby grid lateral wire is wound on said side rod stock.

7. A machine for making helical grids, comprising rotatable side rod stock support means including an elongated mandrel adapted to support grid side rod stock therealong, drive means connected to rotate said mandrel, means adjacent to said mandrel for feeding a grid lateral wire thereto, whereby rotation of said mandrel causes said grid lateral wire to be wound on said side rod stock to form grid strip, strip feed means axially aligned with and spaced from said mandrel for feeding said grid strip in a path axially aligned with said mandrel, said strip feed means including gripping means adapted to bite into said side rod stock and engage said strip and continuously move said strip in a path axially away from said mandrel, means connected to said drive means and to said strip feed means for rotating said strip feed means in synchronism with said mandrel, and grid strip stretching means axially aligned with said mandrel and engaging said strip feed means for stretching said grid strip during its travel in said path.

8. Grid making apparatus comprising a rotatable mandrel adapted to support grid side rod stock, drive means connected to said mandrel for continuous rotation thereof, feed means adjacent to said mandrel adapted to feed grid lateral wire to said mandrel for producing grid strip, grid strip feed means spaced from and axially aligned with said mandrel and adapted to engage said strip for feeding said strip continuously away from said mandrel, said strip feed means including two spaced gripping heads having rotatable members adapted to asynchronously grip said strip, said gripping heads asynchronously movable in paths axially aligned with said mandrel, said drive means connected to said members for rotating said members and mandrel in unison, and means fixed in a turnbuckled engagement with one of said rotatable members for rotational and axial movement therewith and for movement in a direction axially away from said one rotatable member and from said mandrel and adapted to engage said strip with said one rotatable member for stretching the portion of said strip between said member and said last named means.

9. In a grid winding apparatus, a gripping mechanism comprising a generally tubular spindle having a longitudinal axis, means connected to said spindle for rotating the same, one end of said spindle comprising a generally circular disk-like portion having a pair of spaced-apart plate portions defining a channel between them, an upper slide plate and a lower slide plate moveable in said channel, a rotatable ring gear disposed adjacent to said disk-like portion and around said axis, and means connecting said ring gear and said slide plates to move said slide plates with respect to each other in said channel in response to a rotational movement of said ring gear.

10. A gripping mechanism comprising a rotatable spindle having a central bore, means for rotating said spindle, said spindle including a tubular portion and a disk-like portion at one end of said tubular portion, said disk-like portion having a front face in a plane substantially normal to the axis of said bore, a pair of spaced-apart gibs fixed to said front face of said disk-like portion and defining a channel between said gibs, a pair of slide plates slidably mounted in said channel and on opposite sides of said axis, and means connected to said slide plates for moving them toward and away from each other during rotation of said spindle, whereby said mechanism is adapted to receive a grid strip through said bore and to support said strip therein for rotation with said spindle.

11. Grid making apparatus comprising a rotatable mandrel adapted to support grid side rod stock, drive means connected to said mandrel for continuous rotation thereof, feed means adjacent to said mandrel adapted to feed grid lateral wire to said mandrel for producing grid strip, grid strip feed means spaced from and axially aligned with said mandrel and adapted to engage said strip for feeding said strip continuously away from said mandrel, said strip feed means including two spaced gripping heads having rotatable members adapted to asynchronously grip said strip, said gripping heads being asynchronously moveable in a path axially aligned with said mandrel, said drive means connected to said members for rotating said members and mandrel in unison, and means connected to one of said rotatable members for rotational and axial movement therewith and for movement in a direction axially away from said one rotatable member and from said mandrel and adapted to engage said strip with said one rotatable member for stretching the portion of said strip between said one member and said last named means.

12. A machine for making helical grids, comprising rotatable side rod stock support means including an elongated mandrel adapted to support grid side rod stock therealong, drive means for rotating said mandrel, means for feeding a grid lateral wire to said mandrel whereby rotation of said mandrel causes said grid lateral wire to be wound on said side rod stock to form grid strip, strip feed means axially aligned with said mandrel for feeding said grid strip in a path axially aligned with said mandrel, said strip feed means including gripping means adapted to frictionally engage said strip, means connected to said drive means and to said strip feed means for rotating said strip feed means in synchronism with said mandrel, and grid strip stretching means axially aligned with said mandrel for stretching said grid strip during its travel in said path, said stretching means comprising a rotatable spindle having a central bore axially aligned with said mandrel, said spindle including a tubular portion and a disk-like portion at one end of said tubular portion, said disk-like portion having a front face in a plane substantially normal to said axis, a pair of spaced apart gibs fixed to said front face of said disk-like portion and defining a channel between said gibs, a pair of slide plates slidably mounted in said channel and on opposite sides of said axis, and means connected to said slide plates for moving them toward and away from each other.

13. In a grid winding apparatus, a grid severing mechanism comprising a generally tubular spindle having a longitudinal axis, means connected to said spindle for rotating the same, one end of said spindle comprising a generally circular disk-like portion having a pair of spaced-apart plate portions defining a channel between them, a cutting mechanism including opposed slide plates having a pair of longitudinally spaced apart co-operating cutting means and moveable in said channel, said cutting means comprising a first cutting member having spaced apart portions defining a channel, a second cutting member mounted for movement in register with said channel and having dimensions for entrance into said channel in a cutting operation, and a third member having spaced portions adapted to engage spaced portions of said grid strip adjacent to the portion thereof in register with said second member during a cutting operation, for restraining deformation of said spaced portions during said operation, a rotatable ring gear disposed adjacent to said disk-like portion and around said axis, and means connecting said ring gear and said slide plates to move said slide plates with respect to each other in said channel in response to a rotational movement of said ring gear, whereby said mechanism is adapted to sever said strip during a feeding thereof into individual grids each having independently shaped ends.

14. The grid severing mechanism claimed in claim 13 and wherein said cutting means have contours for forming spaced-apart grid ends into similar prismoids.

15. A grid-severing mechanism comprising a rotatable spindle having a central bore, means for rotating said spindle, said spindle including a tubular portion and a disk-like portion at one end of said tubular portion, said disk-like portion having a front face in a plane substantially normal to the axis of said bore, a pair of spaced apart gibs fixed to said front face of said disk-like portion and defining a channel between said gibs, a pair of slide plates adapted to receive a grid strip portion between them and slidably mounted in said channel and on opposite sides of said axis, said plates having a pair of co-operating cutting means spaced apart along said axis and adapted to cut through said grid strip at spaced apart portions for simultaneously and independently shaping the leading end portion of one grid and the trailing end portion of another grid, and means connected to said slide plates for moving them toward and away from each other during rotation of said spindle, whereby said mechanism is adapted to receive a rotating grid strip through said bore and to form said strip into individual grids each having independently shaped end portions.

16. A grid strip stretching mechanism comprising a pair of axially aligned, spaced grid strip gripping members mounted for common rotation about a common axis and for common movement in directions along said axis and fixed to each other in a turnbuckled engagement for further movement relative to each other in said directions, said members being mounted for said further movement during said common movement thereby to effect a stretching of a grid strip during a transport thereof.

17. A machine for making helical grids, comprising rotatable side rod stock support means including an elongated mandrel adapted to support grid side rod stock therealong; drive means connected to rotate said mandrel; means adjacent to said mandrel for feeding a grid lateral wire thereto, whereby rotation of said mandrel causes said grid lateral wire to be wound on said side rod stock to form grid strip; strip feed means axially aligned with said mandrel for feeding said grid strip in a path axially aligned with and spaced from said mandrel, said strip feed means including gripping means adapted to frictionally engage said strip and continuously move said strip in a path axially away from said mandrel; means connected to said drive means and to said strip feed means for rotating said strip feed means in synchronism with said mandrel; grid strip stretching means, including said gripping means, axially aligned with said mandrel and moveable in a direction away from said mandrel to perform a stretching operation during its travel in said path and moveable in a direction opposite said direction; and stretch control means connected to said stretching means for actuating said gripping means during a movement thereof in said direction and during a portion only of said movement of said stretching means in said opposite direction thereby to release the residual elasticity of said strip after a stretching operation without scratching said strip.

18. In grid winding apparatus, a mechanism comprising power transfer means and grid strip gripping means connected to said transfer means for gripping a grid strip during uniform rotation of said gripping means; said power transfer means comprising a shaft mounted for uniform rotation, a drive gear connected to said shaft, a driven gear in gear driving relation with said drive gear, a spindle fixed to said driven gear for rotation therewith, a ring gear yieldably connected to said spindle for rotation therewith, a brake gear in gear driving relation with said ring gear, and a brake fixed to said brake gear and energizable to brake said brake gear for reducing the rotation of said ring gear relative to said spindle; said grid strip gripping means comprising a pair of slide plates mounted on said spindle and biased in a normally open position and closable into a grid strip gripping position by a rotation of said ring gear relative to said spindle; whereby said slide plates are adapted to be opened and closed, under control of said brake, during a uniform rotation of said spindle.

19. The mechanism claimed in claim 18 wherein said shaft comprises a spline shaft and said drive gear is splined to said spline shaft, whereby said grid strip gripping means is adapted to be moved in an axial direction relative to said spline shaft thereby enabling said gripping means to feed a grid strip in said direction during a rotation thereof.

20. A grid winding apparatus comprising an elongated mandrel adapted to support in parallel relation thereto a grid side rod stock, a first, second, third and fourth means spaced along the axis of said mandrel in the order named, said first means being positioned laterally of said mandrel and adapted to feed lateral grid wire across said mandrel for winding a grid strip, said second means being spaced axially from said mandrel and adapted to grip and move said grid strip along said axis, said third means being adapted to grip said side rod stock, a power transfer mechanism connecting said second means to said third means and moving said third means at a faster rate and in the same direction as said second means, whereby the grid strip gripped between said second and third means is stretched, said fourth means having a gripper and a cutter and adapted to simultaneously grip and cut said grid strip to desired grid length, means interconnecting said second and fourth means for common movement thereof along said axis, and means connected to said mandrel and to said second, third and fourth means for uniformly rotating the same about said axis while said second, third and fourth means move along said axis.

21. A grid winding apparatus according to claim 20 and wherein said first means includes a gripper adapted to grip and restrain the feed of said lateral grid wire after the winding of a grid strip, whereby said lateral wire ruptures on continued rotation of said mandrel, said gripper being movable laterally away from said mandrel after the rupture of said lateral wire a sufficient distance to compensate for elongation of said lateral wire during said rupture thereof.

22. A grid winding apparatus according to claim 21 and wherein said second means includes a tail displacer having a recess adapted to receive a tail of lateral wire remaining on said grid strip after rupture of said wire, and to wrap said tail around said grid side rod stock.

23. A grid winding apparatus according to claim 20, and wherein said gripper of said fourth means includes two members spaced along said axis, and said cutter is positioned between said gripper members, said gripper being adapted to grip said grid strip during a cutting of said strip by said cutter, whereby said grid strip is preserved from deformation during the cutting thereof.

24. In a grid winding apparatus, a grid severing mechanism comprising two spaced movable cutting members, a rotatable support for said members, means connected to said support for rotating said support on an axis extending between said cutting members, each of said cutting members having cutting edges spaced along said axis, means connected to said cutting members for moving said cutting edges toward said axis into a cutting operation, whereby two spaced cuts are made simultaneously through a grid supported along said axis to provide a slug, and control means connected to said support for rotation therewith and adapted to control the movements of the slug during rotation of said support.

25. A grid severing mechanism according to claim 24 and wherein said control means includes a baffle member fixed to one of said cutting members and having a passageway extending between said spaced cutting edges of said one of said cutting members for snugly receiving said slug.

26. A grid severing mechanism according to claim 24, and wherein said control means includes a chute fixed to said support and rotatable therewith and adapted to receive said slug, a baffle housing fixed against rotation and surrounding the path of movement of said chute during rotation of said support, whreby a slug issuing from said chute during rotation of said support is deflected for downward fall, said baffle housing having an opening in its lowermost wall, whereby said slug is adapted to drop through said opening, and a tray mounted below said opening and adapted to receive said slug.

27. A grid severing mechanism comprising rotatable means adapted to sever a grid strip to provide an individual grid and a slug, means for rotating said rotatable means on a predetermined axis, a chute spaced from said axis and fixed to said rotatable means for rotation in an arcuate path about said axis and in a predetermined plane, said chute being adapted to receive said slug from said rotatable means, a housing means fixed against rotation and having an opening at least as large as said arcuate path, said chute extending into said opening, whereby said housing means receives said slug from said chute for controlling the movement of said slug, and a second chute fixed to and extending through said housing means, said second chute having a receiving end adjacent to said rotatable means and adapted to receive said individual grid therefrom.

28. A grid severing mechanism comprising a fixed housing member having first and second coaxial openings in opposite walls thereof, said first opening being smaller than said second opening, a first chute having one end fixed across said first opening and the other end extending through said second opening and adapted to receive a grid work piece, whereby said second opening includes an annular portion surrounding said other end of the first chute, a second chute extending through said annular portion and having a free end within said housing member, a rotatable cutting assembly, said second chute being mounted on said assembly and adapted to receive a slug work piece therefrom, and means for rotating said assembly for actuating said assembly in a cutting operation, whereby said slug is forcefully thrown by said second chute into said housing member and is subsequently controlled in movement by said housing member for preserving said mechanism from damage.

29. A grid making apparatus comprising in combination a grid strip feed means, a grid strip stretching means, a grid strip cutting means, said cutting means being spaced from said stretching means in the direction of strip feed, said stretching means moving a portion of said strip toward said cutting means at a faster rate than the feed rate of other portions of said strip, means for releasing the cutting means from the grid strip when said stretching means moves said strip at said faster rate, whereby the grid strip portion between said stretching means and said cutting means is preserved from deformation, and means for rotating said grid strip feeding means, said grid strip stretching means and said grid strip cutting means at the same rotational speed.

30. A grid strip feeding mechanism for a grid making apparatus, comprising three spaced members defining a path for a grid strip, and means connected to two adjacent ones of said members for successively moving said two members in a common direction and in partly overlapping movements of predetermined magnitudes, means connected between one of said two members and the third member for moving said third member in movement of greater magnitude in said direction than the movement of said one of said two members in said direction, whereby said third member and said one of said two members are adapted to stretch a portion of grid strip having its terminal regions engaged by said last-named members, and means for rotating said three members at the same rotational speed.

31. In a grid making apparatus a grid strip feeding mechanism comprising a first and second parallel shaft, a first housing fixed to said first shaft, a second housing fixed to said second shaft, independent cam means for moving said shafts successively through a predetermined axial distance in a common direction, spring means for moving said shafts successively through said distance in a direction opposite to said common direction, said housing having registering passageways therethrough parallel to said shafts and adapted to receive a grid strip, means within said housings for successively gripping and releasing said grid strip, and actuating means connected to said gripping means for actuating said gripping means to gripping position only when said shafts are moved in said common direction, whereby said gird strip is adapted to be fed continuously in said common direction.

32. In a grid making apparatus, a grid strip feeding mechanism comprising first and second housings spaced along a given axis, said housings having registering openings along said axis and adapted to receive a grid strip, gripping means within said housings adapted to successively grip and release said grid strip, means engaging said housings for successively moving said housings in opposite directions along said axis, means within said housings for actuating said gripping means to gripping position only when said housings are moved in one of said opposite directions, and means for rotating said gripping means about said axis.

33. A gripping mechanism comprising a support having a bore therethrough, a pair of slide plates slidably mounted on said support in a plane transverse to the axis of the said bore, said plates being on opposite side of said axis, means for moving said slide plates towards and away from each other, said means comprising a ring surrounding at least a portion of said slide plates, said ring being mounted for rotation on said support and concentric with the axis of said bore, and means for rotating one of said ring and said support with respect to the other thereof.

34. A gripping mechanism comprising a support having a bore therethrough, a pair of slide plates slidably mounted on said support in a plane transverse to the axis of said bore, said slide plates being on opposite side of said axis, said slide plates each comprises a cam portion, means for moving said slide plates towards and away from each other, said means comprises a ring surrounding at least a portion of said cam portion, said ring being mounted for rotation on said support and concentric with said axis, and means for rotating one of said ring and said support with respect to the other thereof.

References Cited in the file of this patent

UNITED STATES PATENTS

| | | |
|---|---|---|
| 1,897,460 | Anderson et al. | Feb. 14, 1933 |
| 1,994,307 | Flaws | Mar. 12, 1935 |
| 2,181,288 | Washburn | Nov. 28, 1939 |
| 2,480,677 | Sheffield | Aug. 30, 1949 |
| 2,596,062 | Abbey | May 6, 1952 |
| 2,610,387 | Borland et al. | Sept. 16, 1952 |
| 2,672,682 | Studebaker et al. | Mar. 23, 1954 |
| 2,719,543 | Maurer | Oct. 4, 1955 |
| 2,778,386 | Lindsay | Jan. 22, 1957 |
| 2,845,691 | Atherton et al. | Aug. 5, 1958 |
| 2,938,549 | Rangabe et al. | May 31, 1960 |